United States Patent [19]
Freiberg

[11] Patent Number: 4,608,412
[45] Date of Patent: Aug. 26, 1986

[54] SILICONE WATER-BASED ELASTOMERIC CAULKING MATERIAL

[75] Inventor: Alan L. Freiberg, Midland, Mich.

[73] Assignee: Dow Corning Corporation, Midland, Mich.

[21] Appl. No.: 737,602

[22] Filed: May 24, 1985

[51] Int. Cl.$^4$ .................. C08L 19/02; C08L 83/14; C08K 3/22
[52] U.S. Cl. .................. 524/724; 524/783; 524/786; 524/788; 524/837; 524/838
[58] Field of Search ............... 524/837, 838, 724, 786, 524/783, 788

[56] References Cited

U.S. PATENT DOCUMENTS

| | | | |
|---|---|---|---|
| 3,355,406 | 11/1967 | Cekada | 260/29.2 |
| 3,706,695 | 12/1972 | Huebner et al. | 117/226 |
| 3,817,894 | 6/1974 | Butler et al. | 260/29.2 M |
| 4,100,124 | 7/1978 | Ichikawa | 524/837 |
| 4,221,688 | 9/1980 | Johnson et al. | 260/29.2 M |
| 4,427,811 | 1/1984 | Elias et al. | 524/96 |
| 4,504,621 | 3/1985 | Lefler | 524/837 |

*Primary Examiner*—C. Warren Ivy
*Attorney, Agent, or Firm*—Edward C. Elliott

[57] ABSTRACT

A silicone caulking material obtained by mixing an anionically stabilized, hydroxyl endblocked polydiorganosiloxane in an aqueous emulsion, dialkyltindicarboxylate, alkylorthosilicate, and inert, non-siliceous filler is capable of yielding an elastomer upon removal of the water immediately upon mixing of the ingredients. When the caulking material also contains 2-amino-2-methyl-1-propanol, the emulsion also has a useful shelf life in that the emulsion shows no gelation upon aging. The physical properties of the elastomer produced by removing the water from the emulsion do not change appreciably during the useful life of the caulking material.

12 Claims, No Drawings

SILICONE WATER-BASED ELASTOMERIC CAULKING MATERIAL

BACKGROUND OF THE INVENTION

1. Field of the Invention

This invention relates to a silicone water-based composition which is useful immediately after mixing as a caulking material.

2. Background Information

Silicone elastomeric emulsions which could be combined with filler to make a product useful as a caulking material were disclosed by Johnson, et al. in U.S. Pat. No. 4,221,688, issued Sept. 9, 1980. Their composition required an aging period after mixing before an elastomeric product was obtained when the water was removed from the emulsion. An improvement in the method of manufacturing such emulsions were disclosed by Elias et al. in U.S. Pat. No. 4,427,811, issued Jan. 24, 1984, in which the filler other than colloidal silica was mixed into the composition after the composition had aged at least two weeks at room temperature. Their method was stated to give improved shelf life of the emulsion. The manufacturing method requires a time of greater than two weeks. The emulsion is an improvement, but the elastomer obtained upon removal of water from the emulsion still shows a lower elongation if the emulsion ages for a period of time before the water is removed.

In order to obtain an elastomer having the properties obtainable when the emulsion is first manufactured, and before a loss in properties due to aging of the emulsion has taken place, it would be necessary to use the emulsion immediately after its manufacture. One method of accomplishing this goal is to store a composition as two or more parts, then make the final mixture at the time of application. This method does not lend itself to the above discussed compositions because they require an aging period between the mixing of the emulsion and the use.

A silicone rubber latex reinforced with silsesquioxanes is taught by Cekada in U.S. Pat. No. 3,355,406, issued Nov. 28, 1967. His curable latex containing an emulsion polymerized hydroxyl endblocked polydiorganosiloxane, silsesquioxane, catalyst, and crosslinker, yielded a rubber when the water was removed. His latexes were used as coatings with a total solids content preferably in the range of 10 to 15 percent by weight. A silicone latex caulk consisting essentially of a siloxane copolymer, filler, aminofunctional alkoxy silane, cationic surfactant, anionic surfactant, and water is disclosed by Butler in U.S. Pat. No. 3,817,894, issued June 18, 1974. He shows the product is stable for at least 7 days under a variety of conditions.

An emulsion which cures upon mixing but is not storage stable is taught by Huebner in U.S. Pat. No. 3,706,695, issued Dec. 19, 1972, which describes a composition useful as an elastomeric electrically conductive coating. The method prepares a composition from an emulsified polydiorganosiloxane, carbon black, organometallic catalyst, and trifunctional silane.

SUMMARY OF THE INVENTION

A silicone caulking material which is usable immediately upon mixing consists essentially of an anionically stabilized, hydroxyl endblocked polydiorganosiloxane, dialkyltindicarboxylate, alkyl orthosilicate of the formula Si(OR')$_4$, and inert filler. The caulking material forms an elastomer upon removal of the water. The mixture has a limited useful life in that it gels within a few days of mixing. A composition which is useful immediately upon mixing, but which also has a useful shelf life, is produced by adding 2-amino-2-methyl-1-propanol.

It is an object of this invention to produce aqueous silicone composition useful as a caulking material that can be used immediately after mixing.

It is an object of this invention to produce an aqueous silicone composition useful as a caulking material that can be used immediately after mixing, has a useful shelf life, and is capable of producing an elastomer upon removal of the water that does not change in physical properties depending upon the age of the emulsion.

DESCRIPTION OF THE INVENTION

This invention is directed to a silicone caulking material consisting essentially of the product obtained by mixing (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms or 2-(perfluoroalkyl)ethyl radicals having less than 7 carbon atoms per radical, present as an emulsion of dispersed particles in water, the emulsion having a pH of greater than 9 and a solids content of greater than 50 percent by weight, (B) from 0.075 to 0.75 part by weight of dialkyltindicarboxylate, (C) from 0.2 to 5 parts by weight of alkyl orthosilicate of the formula Si(OR')$_4$ where R' is a lower alkyl radical of from 1 to 4 carbon atoms inclusive, (D) from 50 to 200 parts by weight of inert, non-siliceous filler, and (E) from 0 to 10 parts by weight of 2-amino-2-methyl-1-propanol, to produce a material having a paste viscosity which can be used immediately upon mixing as a caulking material which forms a silicone elastomer upon removal of the water.

This invention is directed to a silicone caulking material which can be used immediately upon mixing and which can be stored for a period of time before using consisting essentially of the product obtained by mixing (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms or 2-(perfluoroalkyl)ethyl radicals having less than 7 carbon atoms per radical, present as an emulsion of dispersed particles in water, the emulsion having a pH of greater than 9 and a solids content of greater than 50 percent by weight, (B) from 0.075 to 0.75 part by weight of dialkyltindicarboxylate, (C) from 0.2 to 5 parts by weight of alkyl orthosilicate of the formula Si(OR')$_4$ where R' is a lower alkyl radical of from 1 to 4 carbon atoms inclusive, (D) from 50 to 200 parts by weight of inert, non-siliceous filler, and (E) from 1 to 10 parts by weight of 2-amino-2-methyl-1-propanol, to produce a material having a paste viscosity which can be used immediately upon mixing as a caulking material which forms a silicone elastomer upon removal of the water, and which has a shelf life of greater than 6 months.

The composition of this invention is a caulking material which can be used immediately upon mixing. When ingredient (E) is not present, it has a limited shelf life in that it begins to gel within a few days, for example, 10 days. This embodiment is suitable for a manufacturing situation where the composition could be prepared, tested for properties, and then be used before the limited shelf life interfered with the use. For example, the composition could be prepared as two parts which are stored, then mixed together immediately before use. The embodiment in which (E) is present can be used immediately upon mixing, but also has a significant shelf life, for example, greater than 6 months. This embodiment is particularly useful as a commercial material in that the ingredients can be mixed together at one time, tested immediately for properties, and shipped to the user as a convenient, one-package caulking material that gives an elastomer upon removal of the water from the caulking material. The elastomer has little change in properties upon aging of the caulking material before it is used.

The silicone caulking material of this invention is an aqueous emulsion having a viscosity such that it is a paste-type material. The silicone caulking material has this viscosity limitation because it is intended to be used as a caulking material useful in filling cracks and spaces in vertical, overhead, and horizontal surfaces. Silicone emulsions useful as caulking materials are known, but they are deficient in their shelf stability. The physical properties of the elastomer produced upon drying prior compositions change depending upon how long the emulsion has been stored before the elastomer is formed by drying the emulsion. The elastomer produced from emulsions of this invention show less change upon aging of the emulsion.

For purposes of this invention, a paste-type material is defined as a material which is hard enough to give a flow of from 0 to 2.54 cm when measured in accordance with ASTM D 2202 and soft enough so that the extrusion rate is greater than 50 grams per minute at a pressure of 0.62 MPa using a 3.18 mm orifice when measured in accordance with Military Specification MIL-S-88020. A preferred material has a flow of from 0 to 0.8 cm. If the silicone composition is intended for use in vertical or overhead locations, it is preferable that the flow be in this range so that the composition remains in place when extruded and tooled. If the composition is intended only for use in horizontal locations, such as highway joints for example, it is preferred that there be some flow, from 2 mm to 2 cm for example, so that the composition flows and wets the sides of the opening being sealed so that a good bond is obtained.

Because caulking material is commonly stored in a tube and extruded through a nozzle as it is used, the silicone composition has an extrusion rate of greater than 50 grams per minute. The preferred flow rate for compositions of this invention is greater than 500 grams per minute under the above test conditions. Embodiments of this invention can be easily prepared which have both a low flow and a high extrusion rate. This is distinctly different than caulking materials based upon silicone elastomers which are not in emulsion form.

The composition of this invention containing ingredient (E) has a shelf life of greater than 6 months. For purposes of this invention, shelf life is measured by the change in elongation of the elastomer produced by removing the water from the composition. Shelf life is considered as being present when the elongation of elastomer produced after the composition has been aged for 6 months is at least 80 percent of the elongation of elastomer produced immediately after manufacture.

The anionically stabilized, hydroxyl endblocked polydiorganosiloxane used in this invention is now well-known in the art. The hydroxyl endblocked polydiorganosiloxane (A) is one which can be emulsified, which imparts elastomeric properties to the product obtained after the removal of the water from the emulsion, and which is anionically stabilized. Tensile strengths and elongations at break improve with increasing weight average molecular weight(Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up tg about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion, i.e., the polydiorganosiloxane is a dispersed phase of particles in a continuous phase of water.

Ingredient (B) is dialkyltindicarboxylate. The dialkyltindicarboxylates are commercial materials. Preferred dialkyltindicarboxylates include dibutyltindiacetate, dibutyltindilaurate, and dioctyltindilaurate with dioctyltindilaurate most preferred. The dialkyltindicarboxylate can be used as is or it can be made into an emulsion. A suitable emulsion is produced by emulsifying 50 percent by weight of the dialkyltindicarboxylate with water using about 10 percent by weight of sodium alkylarylpolyether sulfonate as the emulsifying agent in any of the well known methods of producing oil-in-water emulsions.

Ingredient (C) is an alkyl orthosilicate of the formula Si(OR')$_4$ where R' is a lower alkyl radical of from 1 to 4 carbon atoms inclusive. Preferred are the ethyl and propyl radicals with ethyl orthosilicate and n-propyl orthosilicate being the preferred alkylorthosilicates. The use of the tetrafunctional orthosilicate is necessary in order to obtain the ability of the silicone caulking material of this invention to yield an elastomer when the water is removed from the emulsion immediately after mixing of the ingredients. For example, when a trifunctional silane such as vinyltrimethoxysilane at a level of 5 parts by weight, is used in place of the tetrafunctional orthosilicate at the same level, it is necessary for the composition to age for a period of days before an elastomer is formed upon removal of the water from the emulsion.

Ingredient (D) is an inert, non-siliceous filler. The filler is non-siliceous because the combination of ingredients (A) and (B) with a siliceous filler in an emulsion at a pH of greater than 9 will produce a reaction which appears to gradually crosslink the polymer, i.e., the modulus of the elastomer produced by drying the emulsion will gradually increase as the emulsion is aged. This is the effect which is greatly diminished in the composition of this invention. Inert fillers suitable for use in anionic silicone emulsions are well-known. The fillers are finely ground with average particle size below 10 micrometers, preferably below 2 micrometers. Examples of fillers include carbon blacks, titanium dioxide, aluminum oxide, calcium carbonate, zinc oxide, and various pigments. Titanium oxide has been found to be particularly useful as an ultraviolet light screening agent. Calcium carbonate is a preferred filler for the caulking materials of this invention, particularly when it is ground to an average particle size of less than 1 micrometer.

Ingredient (E) is 2-amino-2-methyl-1-propanol. This is a commercial material. The addition of the 2-amino-2-methyl-1-propanol to the ingredients of this invention has the effect of improving the shelf life of the caulking material. Without this material present, the caulking material begins to gel in the storage tube. The rate of gelation depends upon the amount of alkylorthosilicate and dialkyltindicarboxylate used. The more of either of these ingredients that are used, the quicker the caulking material gelates. When ingredient (E) is present, this gelation does not occur. The use of ingredient (E) also aids in the dispersion of the filler during the mixing of the ingredients. The elastomer produced upon removal of the water from the caulking material has improved tensile strength and higher elongation when ingredient (E) is present as compared to when it is not present.

The amounts of ingredients used are influenced, to some extent, by the requirements that the composition be of a paste-type viscosity. If the emulsion of (A) has a solids content near the lower limit of 50 percent by weight, a large amount of filler or filler of very small particle size would be required in order to obtain a paste-type viscosity. Preferably the solids content of the emulsion of (A) is about 60 percent by weight or higher. The solids content is determined by placing about 2 grams of material in an aluminum foil dish, heating for 1 hour in an air-circulating oven at 150° C., reweighing, and calculating the weight percent of material remaining.

The composition of this invention is based upon 100 parts by weight of polydiorganosiloxane in the emulsion of (A). From 0.075 to 0.75 part by weight of dialkyltindicarboxylate (B) is used to catalyze the cure of the composition. From 0.075 to 0.4 part by weight of the dialkyltindicarboxylate is preferred. The dialkyltindicarboxylate is preferably in the form of an emulsion as it is then more easily dispersed uniformly during mixing. The amount of alkylorthosilicate (C) can be varied from 0.2 to 5 parts by weight with a preferred range of from 0.5 to 3 parts by weight.

The amount of filler can vary from 50 to 200 parts by weight. The amount used is determined by the solids content of the emulsion of (A) and the nature of the filler or mixture of fillers chosen. Sufficient filler is used so that the final composition is of the required paste-type viscosity and has the characteristics described above which allow its use as a caulking material. If too little filler is used, the composition will not have a high enough viscosity. If too much filler is used, the material will be too stiff to extrude properly from the storage container, or the cured composition will be too brittle. If the ratio of filler to polydiorganosiloxane is too high, the cured 5 product will not be elastomeric. Preferred are amounts of from 125 to 175 parts by weight. Because these characteristics of the composition depend upon what type of filler or filler mixture is chosen and how finely the filler is ground, it is necessary to perform a simple set of experiments using the ingredients chosen to determine the preferred amount of filler. It has been determined that when the emulsion of (A) contains about 60 percent by weight of polydimethylsiloxane, having a weight average molecular weight of about 325,000, the preferred amount of calcium carbonate filler, having an average particle diameter of about 0.7 micrometers, is in the range of from 150 to 165 parts by weight per 100 parts by weight of polydimethylsiloxane.

Ingredient (E), 2-amino-2-methyl-1-propanol is used in an amount of from 0.5 to 10 parts by weight to give the emulsion shelf life. More can be used, but it serves no useful purposes. The preferred amount of (E) is from 1 to 5 parts by weight per 100 parts of polydiorganosiloxane. The preferred amount of (E) is dependent upon the amount of silicate (C) which is selected. For example, for 1 part by weight of n-propylorthosilicate, the preferred amount of (E) is from 0.5 to 2.5 parts by weight; for 2.6 parts by weight of silicate, at least 2.5 parts by weight of (E) is preferred; while at 3 parts by weight of silicate, 4 parts by weight of 5 (E) is preferred.

The silicone compositions of this invention are prepared by ordinary high intensity mixing of the ingredients until a uniform material is obtained. The emulsion of (A) is placed in the mixer, ingredients (B) and (C) are added and mixed, then the filler (D) is slowly added with mixing so that it is uniformly dispersed. Because the final mixture is of a paste-type viscosity, the equipment must be strong enough to properly mix the ingredients at this viscosity. In the laboratory, a stainless steel container in combination with a propeller-type, air-driven mixer can be used. It is not desirable to build up heat during the mixing process. If necessary, the emulsion can be cooled before the filler is mixed in. After a uniform paste is obtained, the mixture is placed under vacuum or centrifuged to remove air entrapped during the mixing process. The deaired mixture is then placed into a sealed storage container.

When ingredient (E) is added to obtain improved shelf life, it is mixed in before the filler is added. Preferably (C) is mixed into (A), then (E) is added and mixed. Next (B) is mixed in and finally (D) is added.

Additional ingredients which can be added to the composition include such things as antifoams to aid during the mixing process, freeze-thaw stabilizers such as glycols to protect the composition if it is accidentally frozen during storage, and pigments such as titanium dioxide and carbon black to provide opaqueness or color to the cured caulking material.

The silicone composition of this invention is particularly useful as a caulking material. It can be easily extruded from a storage tube into place. Because it is an aqueous emulsion, it is easily tooled if necessary. Tools can be cleaned by washing with water. During cure of the emulsion, primarily water is given off so that there is no problem with odor.

The following examples are included for illustrative purposes only and should not be construed as limiting the invention which is properly set forth in the appended claims.

All parts are by weight.

EXAMPLE 1

An emulsion polymerized hydroxyl endblocked polydimethylsiloxane having a weight average molecular weight of about 325,000 was prepared by mixing 54 parts of water, 100 parts of low molecular weight linear hydroxyl endblocked polydimethylsiloxane, and 4 parts of a surfactant consisting of 30 percent sodium lauryl sulfate. This mixture was homogenized, then mixed with 1 part of dodecylbenzene sulfonic acid and allowed to polymerize. After polymerization, the emulsion was made basic by admixing 0.5 part of 50 percent aqueous diethylamine. The emulsion had a pH of approximately 10 and a solids content of about 60 percent by weight. A composition useful as a caulking material was prepared by mixing 172 parts of the above emulsion, 0.5 part of a 50 percent aqueous emulsion of dioctyltindilaurate, 3 parts of n-propylorthosilicate, 4 parts of 2-amino-2-methyl-1-propanol, and 162.5 parts of finely ground calcium carbonate filler having an average particle size of about 0.7 micrometers. The ingredients were stirred until a smooth paste resulted. When a bead of paste was extruded onto a surface immediately after mixing and the water allowed to evaporate, a silicone elastomer resulted.

Samples were prepared by extruding the paste onto a polyethylene coated paper surface and spreading it out into a sheet which was then allowed to dry for 7 days at room temperature. Test samples were cut from the cured elastomeric sheet and tested for elongation according to ASTM D412. Additional sheets were formed and cured after periods of aging the emulsion. These sheets were then measured for elongation. The results in Table I show that the emulsion does not change in properties when shelf aged.

TABLE 1

| Aging Period | Elongation, percent |
| --- | --- |
| none | 560 |
| 3 months | 548 |
| 6 months | 677 |
| 9 months | 568 |
| 12 months | 572 |

When a comparable composition was made which also contained either 4 parts or 8 parts of colloidal silica sol having 50 percent by weight silica, the initial elongation was 600 and 890 percent respectively, but by the end of a 12 month aging period, the elongation had dropped to about 400 percent.

EXAMPLE 2

A series of compositions useful as caulking materials having different levels of filler were prepared.

Each composition was prepared by mixing 172 parts of the polydimethylsiloxane emulsion of Example 1, 0.5 part of the dioctyltindilaurate emulsion, 1.5 parts of n-propylorthosilicate, 6 parts of 2-amino-2-methyl-1-propanol, and the parts of finely ground calcium carbonate shown in Table II. The ingredients were stirred until a smooth paste resulted. When a bead of paste was extruded onto a surface immediately after mixing and the water allowed to evaporate, a silicone elastomer resulted.

Samples were prepared and tested as in Example 1 with tensile strength measured in accordance with ASTM D412 and tear strength measured in accordance with ASTM D624. The results are shown in Table II. The samples were stored in polyethylene caulking gun containers and tested after 6, 10, and 14 months at room temperature with the results shown in Table II.

TABLE II

| Filler Amount Parts | Aging Period Months | Tensile Strength MPa | Elongation percent | Tear Strength kN/m |
| --- | --- | --- | --- | --- |
| 162.5 | none | 1.03 | 941 | 8.2 |
| 162.5 | 6 | 0.79 | 1016 | 5.8 |
| 162.5 | 10 | 0.80 | 901 | 5.4 |
| 162.5 | 14 | 0.61 | 887 | 4.2 |
| 150 | none | 1.07 | 947 | 8.2 |
| 150 | 6 | 0.79 | 1055 | 5.6 |
| 150 | 10 | 0.74 | 975 | 5.4 |
| 150 | 14 | 0.61 | 956 | 4.2 |
| 140 | none | 1.03 | 947 | 7.4 |
| 140 | 6 | 0.85 | 1080 | 6.3 |
| 140 | 10 | 0.88 | 1081 | 5.6 |
| 140 | 14 | 0.63 | 985 | 4.6 |

That which is claimed is:

1. A silicone caulking material consisting essentially of the product obtained by mixing
    (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms or 2-(perfluoroalkyl)ethyl radicals having less than 7 carbon atoms per radical, present as an emulsion of dispersed particles in water, the emulsion having a pH of greater than 9 and a solids content of greater than 50 percent by weight,
    (B) from 0.075 to 0.75 part by weight of dialkyltindicarboxylate,
    (C) from 0.2 to 5 parts by weight of alkyl orthosilicate of the formula Si(OR')$_4$ where R' is a lower alkyl radical of from 1 to 4 carbon atoms inclusive,
    (D) from 50 to 200 parts by weight of inert, nonsiliceous filler, and
    (E) from 0 to 10 parts by weight of 2-amino-2-methyl-1-propanol
to produce a material having a paste viscosity which can be used immediately upon mixing as a caulking material which forms a silicone elastomer upon removal of the water.

2. The composition of claim 1 in which the polydiorganosiloxane is a polydimethylsiloxane having a weight average molecular weight in the range of from 200,000 to 700,000.

3. The composition of claim 1 in which the dialkyltindicarboxylate is selected from the group consisting of dibutyltindiacetate, dibutyltindilaurate, and dioctyltindilaurate in an amount of from 0.075 to 0.4 part by weight per 100 parts by weight of polydiorganosiloxane.

4. The composition of claim 1 in which R' is selected from the group consisting of ethyl radical and propyl radical in an amount of from 0.5 to 3 parts by weight per 100 parts by weight of polydiorganosiloxane.

5. The composition of claim 1 in which the filler is selected from the group consisting of aluminum oxide, titanium dioxide, zinc oxide, and calcium carbonate, has an average particle size of less than 5 micrometers, and is present in an amount of from 125 to 175 parts by weight per 100 parts by weight of polydiorganosiloxane.

6. The composition of claim 2 in which the dialkyltindicarboxylate is dioctyltindilaurate or dibutyltindilaurate in an amount of from 0.075 to 0.4 part by weight, the alkyl orthosilicate is ethylorthosilicate or n-propylorthosilicate in an amount of from 0.5 to 3 parts by weight, and the filler is calcium carbonate having an average particle size of less than 2 micrometers.

7. The composition of claim 1 in which (E) is present in an amount of from 0.5 to 10 parts by weight per 100 parts by weight of polydiorganosiloxane, and which has a shelf life of greater than 6 months.

8. The composition of claim 2 in which (E) is present in an amount of from 0.5 to 10 parts by weight per 100 parts by weight of polydiorganosiloxane, and which has a shelf life of greater than 6 months.

9. The composition of claim 8 in which the dialkyltindicarboxylate is selected from the group consisting of dibutyltindiacetate, dibutyltindilaurate and dioctyltindilaurate, in an amount of from 0.075 to 0.4 part by weight per 100 parts by weight of polydiorganosiloxane.

10. The composition of claim 9 in which R' is selected from the group consisting of ethyl radical and propyl radical in an amount of from 0.5 to 3 parts by weight per 100 parts by weight of polydiorganosiloxane.

11. The composition of claim 10 in which the filler is selected from the group consisting of aluminum oxide, titanium dioxide, zinc oxide, and calcium carbonate, has an average particle size of less than 5 micrometers, and is present in an amount of from 125 to 175 parts by weight per 100 parts by weight of polydiorganosiloxane.

12. The composition of claim 11 in which the dialkyldicarboxylate is dibutyltindilaurate or dioctyltindilaurate in an amount of from 0.075 to 0.4 part by weight, the alkyl orthosilicate is ethylorthosilicate or n-propylorthosilicate in an amount of from 0.5 to 3 parts by weight, and the filler is calcium carbonate having an average particle size of less than 2 micrometers.

* * * * *